May 12, 1953
J. M. McCANDLESS ET AL
2,637,967
SIDE DELIVERY RAKE
Filed Oct. 1, 1951
2 Sheets-Sheet 1
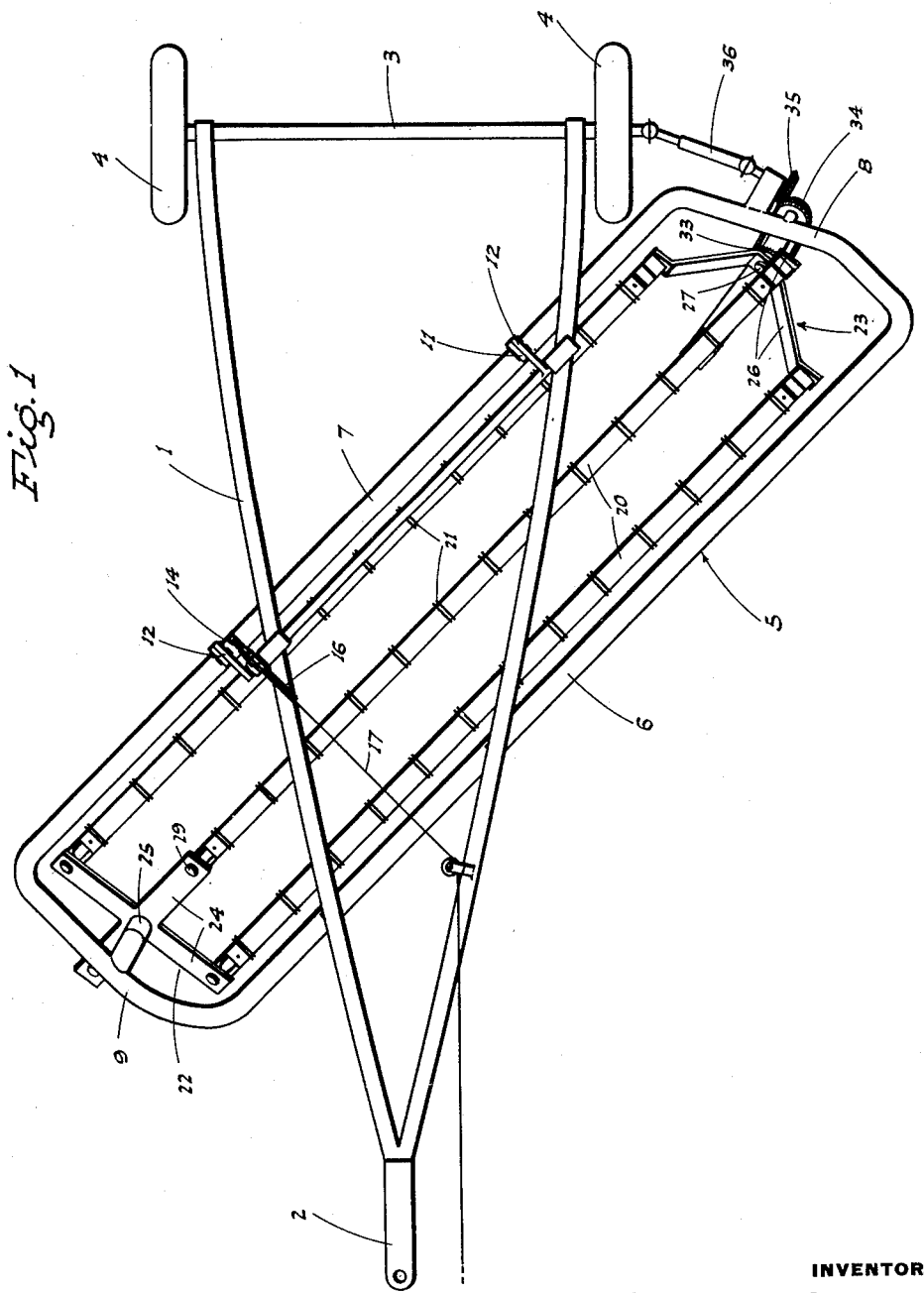
INVENTORS
James M. McCandless
Levi Bentz
BY
ATTORNEYS

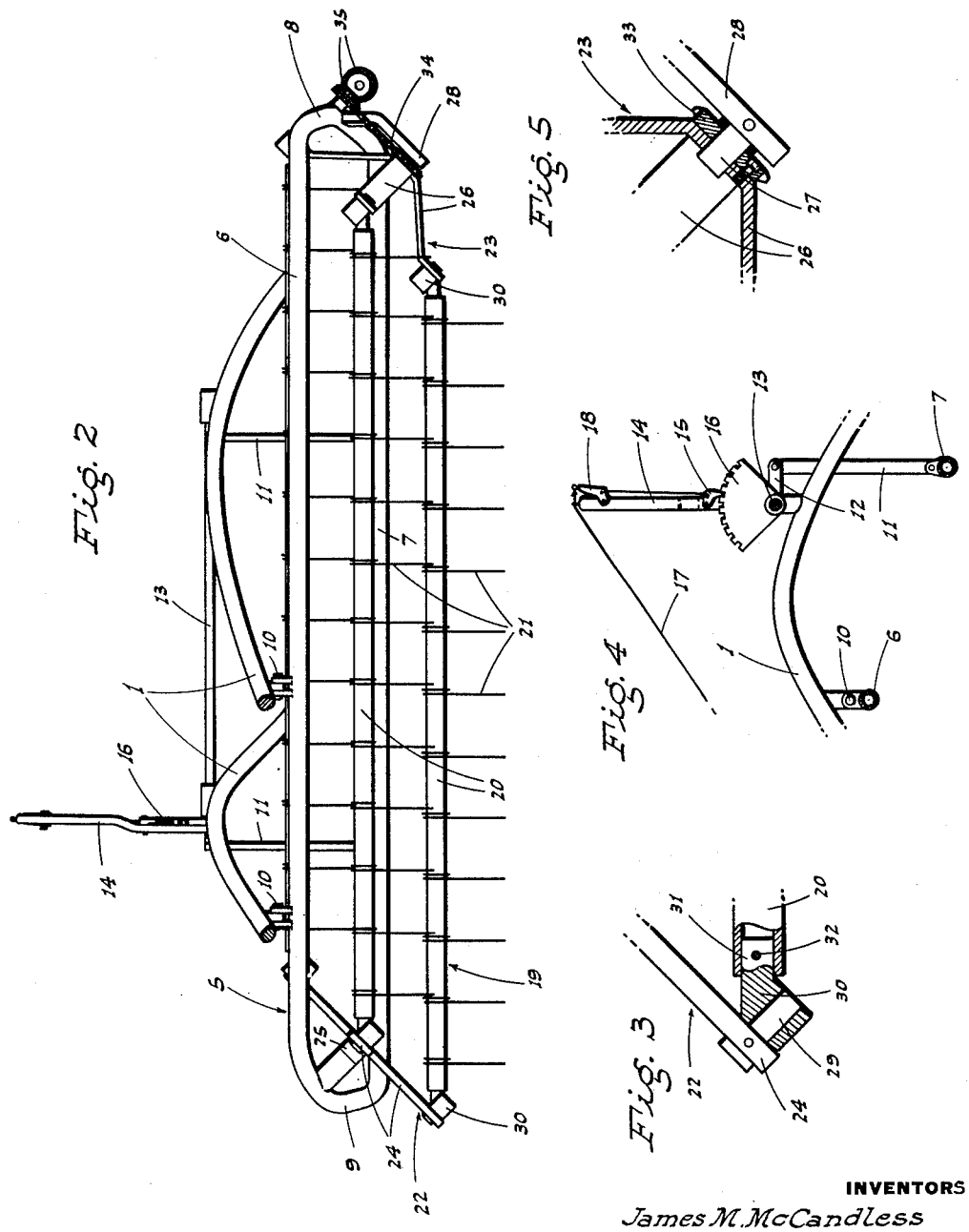

Patented May 12, 1953

2,637,967

UNITED STATES PATENT OFFICE 2,637,967

SIDE-DELIVERY RAKE

James M. McCandless and Levi Bentz,
Chico, Calif.

Application October 1, 1951, Serial No. 249,138

1 Claim. (Cl. 56—377)

This invention relates generally to an improvement in side delivery rakes of the type which includes a driven frame-supported reel or rotary sweep disposed diagonally of the direction of travel, and having rows of tines depending from the reel rods; there being control mechanism included in the reel at the ends to cause the tines to remain in a depending position during rotation of the reel whereby to prevent entanglement of the hay.

The present invention is directed in particular to, and it is the primary object to provide, an improved control mechanism in a rake as above; such control mechanism being operative to not only maintain the tines dependent at all times, but impart a lateral motion thereto in the direction of the discharge end of the reel as such tines work about the bottom portion thereof in hay engaging relation.

Another important object of this invention is to provide a control mechanism, as in the preceding paragraph, which comprises spider-type end rotors, for the reel, journaled in novel manner between the reel rods at the ends and the supporting frame; such rotors—to attain the desired result—being canted, in parallel planes spaced laterally of the direction of travel, on parallel axes disposed in a common substantially vertical plane which extends diagonally of the line of travel of the rake.

A further object of the invention is to provide a control mechanism, for the reel of a side delivery rake, which functions smoothly and positively; the structure being such that it requires a minimum of maintenance or repair.

It is also an object of the invention to provide a control mechanism, for the reel of a side delivery rake, which is designed for ease and economy of manufacture.

Still another object of the invention is to provide a control mechanism, for the reel of a side delivery rake, which is practical and reliable; being exceedingly effective for the purpose for which it is designed.

These objects are accomplished by means of such structure and relative arrangement of parts as well fully appear by a perusal of the following specification and claim.

In the drawings:

Fig. 1 is a top plan view of a side delivery rake embodying the present invention.

Fig. 2 is a transverse sectional elevation of the rake taken ahead of the reel and looking rearwardly.

Fig. 3 is an enlarged fragmentary elevation, partly in section, showing the connection between one of the reel rods and the outer end of the related spider arm of the adjacent rotor.

Fig. 4 is an enlarged fragmentary elevation showing the means for adjusting the reel supporting frame up or down.

Fig. 5 is an enlarged fragmentary elevation, partly in section, showing the center or hub mounting of the driven one of the rotors.

Referring now more particularly to the characters of reference on the drawings, the implement comprises an elongated arch-type draft frame 1 which is generally triangular in plan, being fitted—at the forward end—with a hitch 2, and at the rear including a transverse axle 3 which carries, at its outer ends, the rear supporting wheels 4.

An elongated, diagonally disposed reel supporting frame, indicated generally at 5, is disposed beneath the draft frame 1 intermediate its ends, and said frame 5 is of relatively narrow, open or skeleton construction, including a front bar 6 and a rear bar 7 connected together by end bars 8 and 9.

The reel supporting frame 5 is vertically adjustably suspended from the draft frame 1 by means of transversely spaced pivotal connections 10 between the front bar 6 and said frame 1, and transversely spaced, pivotally connected lift links 11 which extend between the reel bar 7 and radial arms 12 on a cross shaft 13 journaled in connection with the frame 1 above the same. The cross shaft 13 is normally but adjustably maintained in a selective position of rotative adjustment by means of an upstanding lever 14 fixed on said cross shaft and latched, as at 15, to a notched quadrant 16. The latch 15 is adapted to be released and the lever 14 pulled forwardly, to raise the frame 5, by means of a pull cord 17 which connects to a release handle 18 on the upper end portion of lever 14, thence extending forwardly to the tractor. With this arrangement the operator from his seat on the tractor can effect vertical adjustment of the frame 5, as necessary.

An elongated reel or rotary sweep, indicated generally at 19, is disposed in the reel supporting frame 5, being likewise diagonal to the direction of travel.

The reel 19 includes a plurality of circumferentially spaced, longitudinal, tine supporting rods 20, and rows of tines 21 depend in parallelism from such rods.

At the ends thereof the reel 19 is fitted with spider-type rotors, indicated at 22 and 23 respectively; such rotors being constructed and journaled as follows:

The spider-type rotors 22 and 23 are canted, on parallel axes, spaced laterally of the direction of travel, with such axes disposed in a common substantially vertical plane extending diagonally of the rake. This arrangement of the rotors is important to the accomplishment of their intended function, as will hereinafter appear.

The rotor 22 includes spider arms 24, and such rotor is journaled centrally on a trunnion 25 which extends at a downward and inward incline from the end bar 9, while the rotor 23, which includes spider arms 26, is journaled centrally on a trunnion 27 which extends at an upward and inward incline from a fixed bracket 28 which extends downwardly from the end bar 8. In this manner the rotors 22 and 23 are mounted in their desired laterally canted position, yet in parallelism and for rotation.

At the outer ends of the spider arms 24 and 26 of the rotors 22 and 23 respectively, such arms are journaled in connection with the adjacent ends of the corresponding tine-supporting rods 20 by means of short spindles 29 which extend from said arms—parallel to the axis of rotation of the corresponding rotor—into attachment or bearing blocks 30 having a plug 31 secured in the related rod 20 by a cross pin 32.

The reel 19 is driven as follows:

The rotor 23 is of generally frusto-conical configuration in order to give it sufficient reach for journaling on the trunnion 27, and at the central or hub portion thereof and about such trunnion said rotor is fitted with a sprocket 33 driven by an endless chain 34 from a direction-changing bevel gear unit 35. In turn, the bevel gear unit 35 is actuated by a universal drive shaft assembly 36 from the hub of one of the rear wheels 4.

When the described side delivery rake is in use the drive is such that the reel 19 turns contra to the direction of travel; i. e. the reel sweeps forwardly at the bottom and thence upwardly at the front.

By reason of the mounting of the rotors 22 and 23 in connection between the tine supporting rods 20 and the reel supporting frame 5 in the manner described, the reel rotates about a horizontal axis, and not only are the tines 21 always maintained in a dependent position to prevent hay entanglement as the reel turns, but additionally such tines have a positive lateral motion imparted thereto in the direction of the discharge end of the reel as such tines traverse the lower portion thereof. As a result the hay is not only swept or rolled forward as the implement advances, but it is caused to positively travel toward the discharge end of the reel, wind-rowing cleanly from its discharge end.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a side delivery rake embodying a frame, and a driven, frame supported reel which extends diagonally of the direction of travel and includes longitudinal, circumferentially spaced rods having rows of tines depending therefrom; control mechanism between the ends of the reel and the frame arranged so that the driven reel turns about a horizontal axis with the tines remaining dependent at all times and sweeping laterally toward the discharge end of the reel when in the lower portion thereof; said control mechanism comprising a rotor for each end of the reel, the axes of the rotors being parallel and canted both laterally of the direction of travel and relative to a horizontal plane transversely of the rake means journaling the rotors in connection with the frame for rotation about said axes, and means journaling the rods at the ends in connection with adjacent rotors for relative rotation about separate axes parallel to said first named axes.

JAMES M. McCANDLESS.
LEVI BENTZ.

References Cited in the file of this patent
UNITED STATES PATENTS

| Number | Name | Date |
|---|---|---|
| 818,899 | Martin | Apr. 24, 1906 |
| 842,208 | Kirkman | Jan. 29, 1907 |
| 935,456 | Blackstone et al. | Sept. 28, 1909 |
| 1,224,876 | Bamford | May 1, 1917 |
| 1,291,392 | Burgess | Jan. 14, 1919 |
| 2,040,692 | Hitchcock | May 12, 1936 |
| 2,403,401 | Rietz | July 2, 1946 |
| 2,518,389 | Sisulak | Aug. 8, 1950 |
| 2,531,934 | Crose | Nov. 28, 1950 |